United States Patent
Tornhill

(10) Patent No.: US 11,281,458 B2
(45) Date of Patent: Mar. 22, 2022

(54) EVALUATION OF DEVELOPER ORGANIZATIONS

(71) Applicant: Codescene AB, Malmö (SE)

(72) Inventor: Adam Tornhill, Malmö (SE)

(73) Assignee: CODESCENE AB, Malmö (SE)

( * ) Notice: Subject to any disclaimer, the term of this patent is extended or adjusted under 35 U.S.C. 154(b) by 0 days.

(21) Appl. No.: 16/648,871

(22) PCT Filed: Sep. 18, 2018

(86) PCT No.: PCT/EP2018/075183
§ 371 (c)(1),
(2) Date: Mar. 19, 2020

(87) PCT Pub. No.: WO2019/057702
PCT Pub. Date: Mar. 28, 2019

(65) Prior Publication Data
US 2020/0285463 A1    Sep. 10, 2020

(30) Foreign Application Priority Data

Sep. 20, 2017  (SE) .................................... 1751168-4

(51) Int. Cl.
*G06F 8/71*    (2018.01)
*G06F 8/77*    (2018.01)
(52) U.S. Cl.
CPC . *G06F 8/71* (2013.01); *G06F 8/77* (2013.01)
(58) Field of Classification Search
USPC ....................................................... 717/101
See application file for complete search history.

(56) References Cited

U.S. PATENT DOCUMENTS

2006/0248504 A1*  11/2006  Hughes ............... G06F 11/3664
                                                        717/101
2008/0046860 A1*  2/2008  Kratschmer .......... G06F 11/008
                                                        717/101
(Continued)

OTHER PUBLICATIONS

Moura, Marcello Henrique Dias De et al., "Extracting New Metrics from Version Control System for the Comparison of Software Developers", 2014 Brazilian Symposium on Software Engineering, Sep. 28, 2014, 10 pages.
Ball, Mike, "Collecting Basic Team and Sprint Metrics with Git", http://www.mikeball.us/blog/collecting-team-metrics-with-git/. Aug. 11, 2012, 3 pages.
(Continued)

*Primary Examiner* — John Q Chavis
(74) *Attorney, Agent, or Firm* — Sage Patent Group

(57) ABSTRACT

A method is disclosed of evaluating an organizational partition of developers into groups, wherein the evaluation is in relation to alterations of a software code. The software code is associated with a change history register indicative of previous alterations of the parts of the software code, each previous alteration being associated with a developer identity. The method includes parsing the change history register to acquire an association metric indicative of a number of associations between a developer identity and one of the previous alterations. The method also includes determining intra-group collaboration metrics and inter-group collaboration metrics for each group based on the association metrics. The intra-group collaboration metric is indicative of a sum over one or more parts of the software code.

15 Claims, 2 Drawing Sheets

(56) References Cited

U.S. PATENT DOCUMENTS

| 2009/0138843 | A1* | 5/2009 | Hinton ..................... G06F 8/74 |
| | | | 717/101 |
| 2014/0101631 | A1* | 4/2014 | Hughes .......... G06Q 10/063112 |
| | | | 717/101 |
| 2016/0048805 | A1* | 2/2016 | Blincoe ................ G06Q 10/101 |
| | | | 717/102 |
| 2016/0364675 | A1 | 12/2016 | Sharma et al. |

OTHER PUBLICATIONS

Huang, Po-Han et al., "Using Version Control System to Construct Ownership Architecture Documentations", F.L. Gaol (Ed.): Recent Progress in Data Engineering and Internet Technology, vol. 1, Lecture Notes in Electrical Engineering, vol. 156, Springer-Verlag Berlin Heidelberg, Jan. 2013, 7 pages.

Lungu, Mircea et al., "The Small Project Observatory: Visualizing software ecosystems", Science of Computer Programming 75 (2010), Sep. 11, 2009, 12 pages.

Shin, Yonghee et al., "Evaluating Complexity, Code Churn, and Developer Activity Metrics as Indicators of Software Vulnerabilities", IEEE Transactions on Software Engineering, vol. 37, No. 6, Nov./Dec. 2011, 16 pages.

Office Action dated Sep. 27, 2019 for Swedish Patent Application No. 1751168-4, 7 pages.

Office Action dated Apr. 25, 2018 for Swedish Patent Application No. 1751168-4, 9 pages.

International Search Report and Written Opinion dated Dec. 5, 2018 for International Application No. PCT/EP2018/075183, 14 pages.

* cited by examiner

EVALUATION OF DEVELOPER ORGANIZATIONS

CROSS REFERENCE TO RELATED APPLICATIONS

This application is a 35 U.S.C. § 371 national stage application of PCT International Application No. PCT/EP2018/075183 filed on Sep. 18, 2018, which in turn claims priority to Swedish Patent Application No. 1751168-4 filed on Sep. 20, 2017, the disclosures and content of which are incorporated by reference herein in their entirety.

TECHNICAL FIELD

The present disclosure relates generally to the field of software code development and maintenance. More particularly, it relates to evaluation of organizational partitions of a plurality of developers into groups of developers and/or to reduction of hardware utilization for software code development.

BACKGROUND

Organizations for software development—comprising a plurality of developers—are often divided into several groups (teams) of developers. It is desirable that the division of developers into groups is as effective as possible so that the cost of development of the software code is minimized. A sub-optimal division of developers into groups typically leads to one or more of the following problems: less compact software code, more iterations of the software development (and thereby more versions of the code, a higher number of commits, and/or more compilations of the software code), etc. These problems are typically particularly pronounced when the organization for software development is complex (e.g., large in terms of number of developers and/or number of groups) and/or when the software code comprises a large amount of parts and/or lines of code.

In a typical scenario, communication issues and/or coordination issues between groups of developers start to drive the cost of development of the software code as soon as the plurality of developers exceeds some threshold value (e.g. around 10-12 developers). When a software development organization is geographically distributed (possibly in different time zones), this problem becomes even more prominent.

A traditional approach to the problem of finding an efficient organization is to observe the organization manually and dynamically adapt it as deemed suitable. Since such observation is manual, it is not easily applicable to large organizations where it is cumbersome to get an overview of all relevant communication and coordination. Furthermore, the observation is in itself decreasing efficiency since it requires one or more persons dedicated to the observation task. Yet a disadvantage with this type of approach is that a successive decrease in efficiency is typically not spotted at an early stage but only when it reaches some critical level.

Another approach to developer organization analysis is disclosed in M. Cataldo and S. Nambiar, "Quality in Global Software Development Projects: A Closer Look at the Role of Distribution", Proceedings of the 2009 Fourth IEEE International Conference on Global Software Engineering, pp. 163-172. Therein, social network analysis is applied to software projects by analyzing tasks planned for a particular release of the software code, which only gives limited information regarding efficiency of the organization.

Therefore, there is a need for alternative (and preferably improved) approaches to evaluate the efficiency of a software development organization to reduce hardware utilization for software code development.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It should be noted that when software development is referred to herein the corresponding statement is equally applicable to software maintenance, and vice versa.

It is an object of some embodiments to solve or mitigate, alleviate, or eliminate at least some of the above or other disadvantages.

According to a first aspect, this is achieved by a method of evaluating an organizational partition of a plurality of developers into groups of developers, wherein each developer has a developer identity, and wherein the evaluation is in relation to alterations, by the plurality of developers, of a software code comprising a plurality of parts.

The software code is associated with a change history register indicative of previous alterations of the parts of the software code, each indication of previous alteration of a part of the software code being associated in the change history register with the developer identity of one or more of the plurality of developers. The software code and the change history register are comprised in storing circuitry.

The method comprises (for each of at least two of the groups of developers and for each of one or more of the parts of the software code) parsing—based on the part, on the developer identities of the developers of the group, and on one or more of the previous alterations—the change history register to acquire, for each developer identity of the group, an association metric indicative of a number of associations between the developer identity and an indication of one of the one or more previous alterations of the part of the software code.

The method also comprises (for each of at least two of the groups of developers) determining an intra-group collaboration metric based on the association metrics, wherein the intra-group collaboration metric is indicative of a sum over one or more parts of the software code of a number of times two or more developers of the group are involved in one or more previous alterations of the part, and determining an inter-group collaboration metric based on the association metrics, wherein the inter-group collaboration metric is indicative of a sum over one or more parts of the software code of a number of times one or more developers of the group and one or more developers of another group are involved in one or more previous alterations of the part.

The method further comprises generating a partition evaluation signal based on the intra-group collaboration metric and the inter-group collaboration metric of the at least two groups of developers.

In some embodiments, determining the intra-group collaboration metric comprises determining a mutual metric of each intra-group pair of developers of the group, and/or determining the inter-group collaboration metric comprises determining a mutual metric of each inter-group pair of developers. Each mutual metric is, according to some embodiments, indicative of a sum over one or more parts of the software code of a number of times the developers of the corresponding pair are involved in one or more previous alterations of the part.

In some embodiments, the method further comprises determining a clustering metric for each group based on the intra-group collaboration metric and on the inter-group collaboration metric. The partition evaluation signal may be indicative of the clustering metric in such embodiments.

In some embodiments, each indication of previous alteration of a part of the software code is further associated in the change history register with a time indication. Then, determining the collaboration metrics may comprise excluding, from the determination, previous alterations associated with a time indication outside a time window of the change history register.

The method is repeatedly performed at different points in time according to some embodiments, and may further comprise determining a trend of at least one of the intra-group collaboration metric and the inter-group collaboration metric. The partition evaluation signal may be indicative of the determined trend in such embodiments.

In some embodiments, the method further comprises determining a new organizational partition of the plurality of developers based on the partition evaluation signal to increase the intra-group collaboration metric and to decrease the inter-group collaboration metric.

In some embodiments, generating the partition evaluation signal is for determination of a new software architecture based on the partition evaluation signal to increase the intra-group collaboration metric and to decrease the inter-group collaboration metric.

In some embodiments, the partition evaluation signal is configured to cause control of hardware utilization associated with alteration software code.

A second aspect is a hardware utilization control method comprising performing the method of evaluating according to the first aspect and controlling hardware utilization associated with alteration of the software code based on the partition evaluation signal.

A third aspect is a computer program product comprising a non-transitory computer readable medium, having thereon a computer program comprising program instructions. The computer program is loadable into a data processing unit and configured to cause execution of the method according to the first or second aspect when the computer program is run by the data processing unit.

A fourth aspect is a computer program product comprising a computer program loadable into a data processing unit and configured to cause execution of the method according to the first or second aspect when the computer program is run by the data processing unit.

A fifth aspect is an arrangement for evaluation of an organizational partition of a plurality of developers into groups of developers, wherein each developer has a developer identity, and wherein the evaluation is in relation to alterations, by the plurality of developers, of a software code comprising a plurality of parts.

The software code is associated with a change history register indicative of previous alterations of the parts of the software code, each indication of previous alteration of a part of the software code being associated in the change history register with the developer identity of one or more of the plurality of developers. The software code and the change history register are comprised in storing circuitry.

The arrangement comprises controlling circuitry associated with the storing circuitry and configured to cause execution of method steps of the first aspect.

A sixth aspect is an apparatus for hardware utilization control comprising the arrangement according to the fifth aspect, wherein the controlling circuitry is further configured to cause control of hardware utilization associated with alteration of the software code based on the partition evaluation signal.

A seventh aspect is a control node comprising the arrangement according to the fifth aspect or the apparatus according to the sixth aspect.

In some embodiments, any of the above aspects may additionally have features identical with or corresponding to any of the various features as explained above for any of the other aspects.

An advantage of some embodiments is that an alternative approach to evaluation of a software development organization is provided.

Some embodiments enable provision of a continuously updated view of how well an organization aligns with the software architecture. Since, some embodiments use the way that an organization actually works as an input the result is more accurate than if project planning information is used for an efficiency evaluation.

The approach according to some embodiments enables measuring of how changes in the partition of a developer organization and/or changes in the software architecture affect the communication and the coordination needs within the organization. This enables evaluation of whether a change (in organization and/or software architecture) has increased or decreased the efficiency.

Furthermore, the approach according to some embodiments provides a possibility to detect inefficiencies at an early stage.

A further advantage with some embodiments is that development costs may be decreased compared to if other approaches are applied.

Yet another advantage is that efficiency trends may be provided according to some embodiment. Thus, the efficiency may be tracked over time.

When referred to herein, efficiency may refer to a high amount of interactions within a group of developers and/or a low amount of interaction between groups of developers. Efficiency may be seen as an expression of the coordination needs of an organization.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where evaluation of an organizational partition of a plurality of developers into groups of developers is enabled. Typically, the evaluation may aim towards increasing efficiency and/or decreasing development cost associated with the organizational partition.

Figure 1:
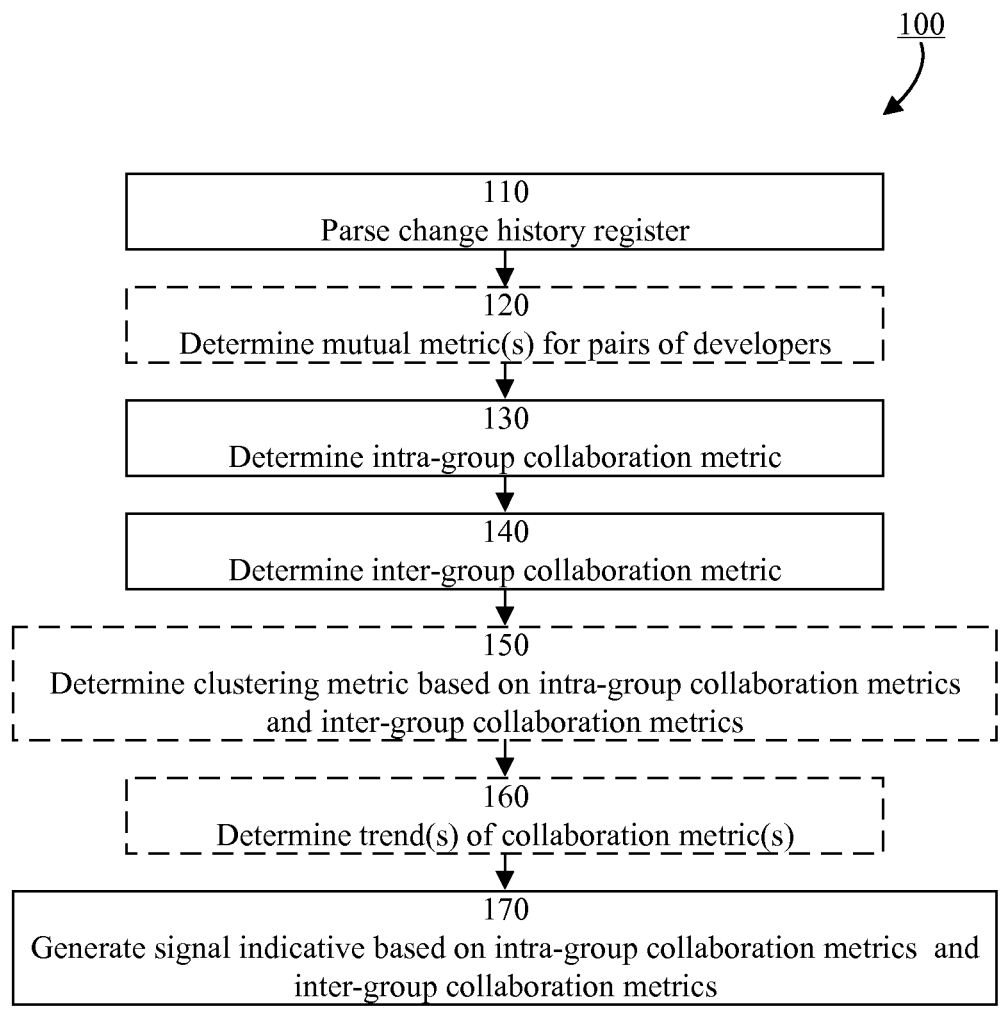
FIG. 1 is a flowchart illustrating example method steps according to some embodiments.

FIG. 1 illustrates an example method 100 of evaluating an organizational partition of a plurality of developers into groups of developers according to some embodiments. The evaluation is in relation to alterations, by the plurality of developers, of a software code comprising a plurality of parts.

When used herein the term parts of a software code is meant to include any suitable partition of the software code. For example, a part of a software code may refer to a file, a group of files, a function, a procedure, a module, a component, etc. One advantage of using modules/components as parts in some embodiments is that developers of the same group may work on different files within a module/component (e.g. database, user interface and automated tests), yet contribute to the same logical building block in the code base. Such collaboration will be captured if modules/components are used as parts herein.

An alteration can be interpreted as any suitable modification or revision (e.g. an addition, a deletion, a rearrangement, etc.). For example, an alteration may be associated with a "commit" of the software code according to the change history register.

The software code is associated with a change history register (e.g. a version control system) indicative of previous alterations of the parts of the software code. The software code and the change history register are comprised in storing circuitry.

Each indication of a previous alteration of a part of the software code is associated in the change history register with a developer identity of one or more of the plurality of developers, i.e. the developer identity is associated with the programmer(s) that committed the alteration. According to some embodiments, each indication of a previous alteration of the software code may, for example, also be associated in the change history register with an indication of which part(s) were altered and/or a time indication for the alteration.

Typically, the example method 100 is performed for all groups of developers, but it may also be performed for a subset of two or more groups of developers. In step 110, the change history register is parsed for each of the groups and for each of one or more parts of the software code. The parsing is based on the part, on the developer identities of the developers of the group, and on one or more of the previous alterations.

The parsing of step 110 is to acquire, for each developer identity of the group, an association metric indicative of a number of associations between the developer identity and an indication of one of the one or more previous alterations of the part of the software code. Thus, when step 110 is completed for a group, information has been acquired for each of the developers of the group as to which of the previous alterations (which "commit") the developer has been involved in and possibly which parts of the software code was altered in the "commit".

In optional step 120, a mutual metric is determined for pairs of developers based on the association metrics. The pairs may be intra-group pairs and/or inter-group pairs. The mutual metric for a pair may be indicative of an amount of interactions between the two developers of the pair. For example, the mutual metric may comprise a number of times the two developers have made alterations to the same part of software code. Typically, the alterations that the two developers have made to the same part of the software code are different previous alterations. However, in some embodiments two or more developers may be associated with the same previous alteration(s). Each mutual metric may be indicative of a number of times the developers of the corresponding pair are involved in any previous alteration(s) of any part(s) of the software code for alterations and parts under consideration. For example, each mutual metric may be indicative of a sum over one or more parts of the software code of a number of times the developers of the corresponding pair are involved in any (the same or different) previous alteration(s) of the part.

An intra-group collaboration metric is determined for each of the groups in step 130 based on the association metrics, and an inter-group collaboration metric is determined in step 140 based on the association metrics. In some embodiments, determination of the collaboration metrics in steps 130 and 140 may involve excluding, from the determination, previous alterations associated with a time indication outside a (sliding) time window of the change history register. Naturally, the width of the time window may be configurable in some embodiments.

The intra-group collaboration metric is indicative of a sum over one or more parts of the software code of a number of times two or more developers of the group are involved in one or more previous alterations of the part. The intra-group collaboration metric may be determined based on the mutual metrics determined in step 120 of each intra-group pair of the group. Typically, the previous alterations to the same part of the software code that the two or more developers have been involved in are different previous alterations. However, in some embodiments the two or more developers may be involved in the same previous alteration(s).

The inter-group collaboration metric is indicative of a sum over one or more parts of the software code of a number of times one or more developers of the group and one or more developers of another group are involved in one or more previous alterations of the part. The inter-group collaboration metric may be determined based on the mutual metrics determined in step 120 of each inter-group pair of developers wherein only one of the developers belongs to the group. Typically, the previous alterations to the same part of the software code that the one or more developers of the group and one or more developers of another group have been involved in are different previous alterations. However, in some embodiments the two or more developers may be involved in the same previous alteration(s).

That a collaboration metric is indicative of a sum over one or more parts of the software code may, for example, be implemented as the collaboration metric being equal to the sum. Other possibilities include the collaboration metric being an average value of the parts or any other value related to or derivable from the sum.

In optional step 150, a clustering metric is determined for each group based on the intra-group collaboration metric and on the inter-group collaboration metric. The clustering metric may, for example, be determined as a ratio between the inter-group collaboration metric and the intra-group collaboration metric for the group. Then, a low value of the clustering metric indicates that there is much collaboration within the group and little collaboration between the developers of this group and developers of other groups. Thus, a low value for a group may indicate that the group is well aligned with its tasks in relation to the software architecture. In some embodiments, local clustering of connections (mutual metrics) is determined in step 150 for each group in relation to other groups. Low local clustering may, in these embodiments, indicate that a group has few inter-group coordination needs.

If the method is repeatedly performed at different points in time, then a trend may be determined, in optional step 160, of at least one of the intra-group collaboration metric and the inter-group collaboration metric. The trend may be expressed as an overall trend for the groups under consideration (i.e. showing if the organization becomes more or less efficient) and/or it may be expressed as a trend for each of the groups (i.e. showing if that group becomes more or less aligned with the software architecture).

In step 170, a partition evaluation signal is generated based on the intra-group collaboration metric and the inter-group collaboration metric. For example, the signal may be indicative of one or more of the intra-group collaboration metric, the inter-group collaboration metric, the clustering metric and the trend for each group under consideration. Alternatively or additionally, the signal may be indicative of one or more overall metrics (e.g. one or more average values) for the groups under consideration.

For example, the partition evaluation signal may be input to a user interface for communicating (part of) the evaluation to a user, e.g. a user associated with the organization of the developers. The user may, for example, be provided with a list of the groups that have the lowest clustering metric and/or a list of the groups that have an increasing trend for inter-group collaboration metric and/or a list of the groups that have a decreasing trend for intra-group collaboration metric. Alternatively or additionally, the partition evaluation signal may be input to storing circuitry (e.g. a memory) for storing of (part of) the evaluation.

The evaluation may be used to determine a new organizational partition of the plurality of developers based on the partition evaluation signal to increase the intra-group collaboration metric and to decrease the inter-group collaboration metric. Changing the organizational partition typically has the aim to make the organizational partition better aligned with the software architecture. Changing the organizational partition may be particularly relevant when a change in software architecture has been performed. Changing the organizational partition may also be relevant when one or more trends are seen in which the inter-group collaboration metric increases, the intra-group collaboration metric decreases, the clustering metric decreases, or similar indications.

Alternatively or additionally, the evaluation may be used to determine new software architecture based on the partition evaluation signal. For example, a module frequently worked on by two different groups may be split into two distinct modules to isolate the work by the different groups from each other.

Determination of the various metrics may be implemented using any suitable known or future algorithms, e.g. network analysis and graph theory.

According to some approaches, the method of FIG. 1 may be used as an analysis step that may be run at regular intervals (e.g. once a day) and determines the change over time (trend) in coordination needs based on code contributions ("commits", alterations).

The coordination needs may be represented as a weighted social network graph (compare with the mutual metrics described above) of developers based on their code contributions from version control data (the change history register). For example, every time two developers work on the same part, their connection strength (mutual metric) may be incremented (e.g. increased by one). Thus, the weights in the graph may be based on frequency of co-work in parts of the software code.

Interaction between the various steps of the example method 100 may be exemplified as follows. The intra- and inter-group collaboration metrics are determined based on the association metrics acquired from the change history register, and the partition evaluation signal is generated based on the intra- and inter-group collaboration metrics for determination of a new software architecture to increase the intra-group collaboration metric and to decrease the inter-group collaboration metric.

An example effect of application of some embodiments of the example method 100, whereby provision of a new software architecture and/or a new organizational partition is enabled, is that the software development can be performed more efficiently due to better matching between the architecture and the organizational partition. For example, the new software architecture and/or the new organizational partition may be such that the intra-group collaboration metric increases and/or the inter-group collaboration metric decreases compared to previously.

More efficient software development in turn results in, e.g., more compact software code and/or less iterations of the software development (and thereby fewer versions, fewer commits, and/or fewer compilations of the software code).

This effect may in turn lead to the effect of decreased hardware utilization. For example, a more compact software code needs less memory resources for storing it; when there are fewer versions and/or fewer commits of the software code, less memory resources (storing circuitry) is needed for storing the versions and/or the content of the change history register; fewer compilations of the software code needs less processing capacity and fewer commits entails fewer write operations being made to hardware (storing circuitry) storing the software code and/or the content of the change history register; etc.

One way to achieve or enhance one or more of the above effects is to let the partition evaluation signal be configured to cause control of software architecture and/or hardware utilization associated with alteration software code. In fact, a method of hardware utilization control may comprise performing the example method 100 and controlling software architecture and/or hardware utilization associated with alteration of the software code based on the partition evaluation signal.

Controlling software architecture and/or hardware utilization based on the partition evaluation signal may take any suitable form. Examples include, but are not limited to the ones presented in the following.

A new software architecture and/or a new organizational partition may be selected based on (e.g., in accordance with) the partition evaluation signal to increase the intra-group collaboration metric and/or to decrease the inter-group collaboration metric.

For example, if the signal indicates that the intra-group collaboration metric of two or more groups has a value that indicates prominent (e.g., frequent) collaboration between the groups regarding a particular software code part, such groups may be merged into one group in a new organizational partition. Alternatively or additionally, the particular software code part may be split into two or more particular software code parts in a new software architecture; one for each of the groups—associated with the work performed mainly by that particular group.

Selection may be performed by technical means (e.g., selection circuitry; which may or may not be comprised in controlling circuitry described later herein) or by one or more users (e.g., a software developer organizer) based on a user interface indication generated from the partition evaluation signal.

Since the selection is based on the evaluation, the alteration of the software code will typically differ—in terms of which software parts are altered and/or when software parts are altered—compared to scenarios when other organizations and/or architectures are applied. Thereby, the efficiency of the alteration of the software code may be improved.

Such improvements may be achieved in terms of a reduction of the overall size of the software code—thereby reducing required storing space. Alternatively or additionally, such improvements may be achieved in terms of a reduction of the number of alterations of the code—thereby reducing the overall size of the change history register (since there are fewer commits) and hence reducing required storing space, and/or processor capacity utilization (since there are fewer compilations.

Figure 2:
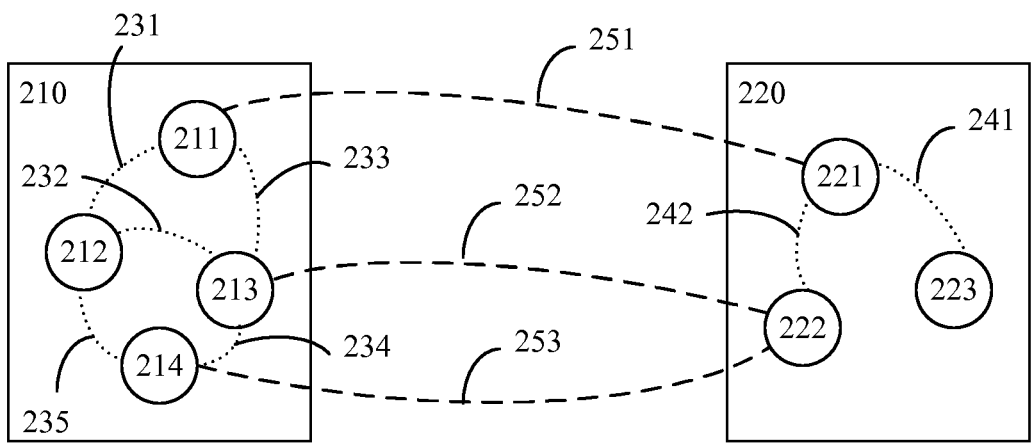
FIG. 2 is a schematic drawing illustrating an example partition of developers according to some embodiments.

FIG. 2 schematically illustrates an example partition of developers 211, 212, 213, 214, 221, 222, 223 into two groups 210, 220. Mutual metrics of pairs are illustrated as dotted lines 231, 232, 233, 234, 235, 241, 242 if the developers of the pair belong to the same group and by dashed lines 251, 252, 253 if the developers of the pair belong to different groups. Each mutual metric value may, for example, comprise a number of times both developers have been involved in (possibly different) alterations of the same part of software code.

For example, the intra-group collaboration metric of group 210 may comprise the sum of the mutual metrics illustrated by 231, 232, 233, 234, 235 and the intra-group collaboration metric of group 220 may comprise the sum of the mutual metrics illustrated by 241, 242, while the inter-group collaboration metric of both the groups 210, 220 (since there are only two groups) may comprise the sum of the mutual metrics illustrated by 251, 252, 253.

For example, the mutual metrics may represent the number of parts where both developers of a pair have worked. If the mutual metrics 241 and 242 have the values 17 and 3, respectively, then the intra-group collaboration metric of group 220 may, for example, be calculated as (17+3)/100=0.20, where 100 is the total number of parts under consideration. Similarly, if the mutual metrics 251, 252 and 253 have the values 1, 8 and 2, respectively, then the inter-group collaboration metric of group 220 (and of group 210) may, for example, be calculated as (1+8+2)/100=0.11.

Figure 3:
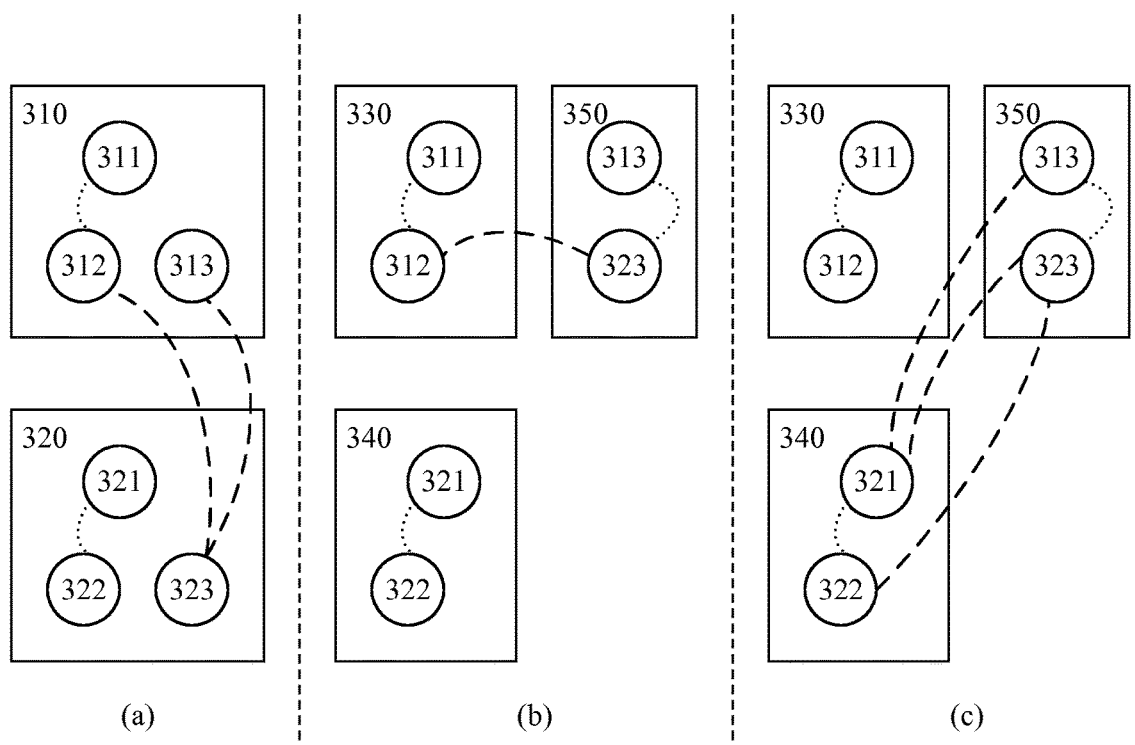
FIG. 3 is a schematic drawing illustrating example partitions of developers at different points in time according to some embodiments.

FIG. 3 schematically illustrates an evolution over time of an example partition of developers 311, 312, 313, 321, 322, 323.

The developers are partitioned into two groups 310, 320 during the first illustrated time interval, denoted by (a). As can be noticed, developer 323 in group 320 has a strong collaboration with developers 312, 313 of group 310 and no collaboration with developers of its own group 320. Furthermore, only two of the group members of each of the groups—311, 312, and 321, 322, respectively—collaborate with each other. These facts contribute to a high inter-group collaboration metric for groups 310, 320 and a low intra-group collaboration metric for each of the groups 310, 320. The organizational partition may thereby be deemed to be in-efficient.

At time 301 an organizational change is made based on a partition evaluation signal generated during the time interval denoted by (a). The resulting organization is shown in the time intervals denoted by (b) and (c). The organizational change comprises constructing three groups 330, 340, 350 instead of two, wherein developer 313 from previous group 310 and developer 323 from previous group 320 form a new group 350. During the time interval denoted by (b) there is only one type of collaboration between the groups of the changed organization, between developers 312, 323, while there is some internal collaboration in each of the three groups. These facts contribute to a low inter-group collaboration metric for groups 330, 350 (and an even lower inter-group collaboration metric for group 340) and a high intra-group collaboration metric for each of the three groups. The organizational partition may thereby be deemed to be efficient.

At time 302 a change of the software architecture is made while the organizational partition from the time interval denoted by (b) is kept. After the change of the software architecture, during the time interval denoted by (c), there is an increased collaboration between the groups, between developers 313, 321, between developers 323, 321, and between developers 323, 322 while the internal collaboration in each of the three groups is fairly un-changed. These facts contribute to a high inter-group collaboration metric for groups 340, 350 (increased compared to the time interval denoted by (b)). The organizational partition may thereby be deemed to be in-efficient again. An organizational change may be considered based on a partition evaluation signal generated during the time interval denoted by (c).

Typically, the approach may use a start date, which is the date when the current organization took effect (compare with 310 of FIG. 3). For example, the connection strength (the mutual metrics) within a group may be calculated from the start date (possibly in combination with application of a sliding time window). Thus, changes noticed (e.g. via trend determination) are relative to the start date. Contrarily, the connection strength (the mutual metrics) between groups may be calculated from the earliest possible date (possibly in combination with application of a sliding time window). Thus, changes noticed (e.g. via trend determination) are relative to all historic data. Thereby, when an organizational change is made, the effectiveness of the change may be evaluated relative to the history prior to the start date.

In some embodiments, there may be a (configurable) threshold specifying a minimum number of contributions (alterations, "commits") needed after an organizational change before the method is run.

Figure 4:
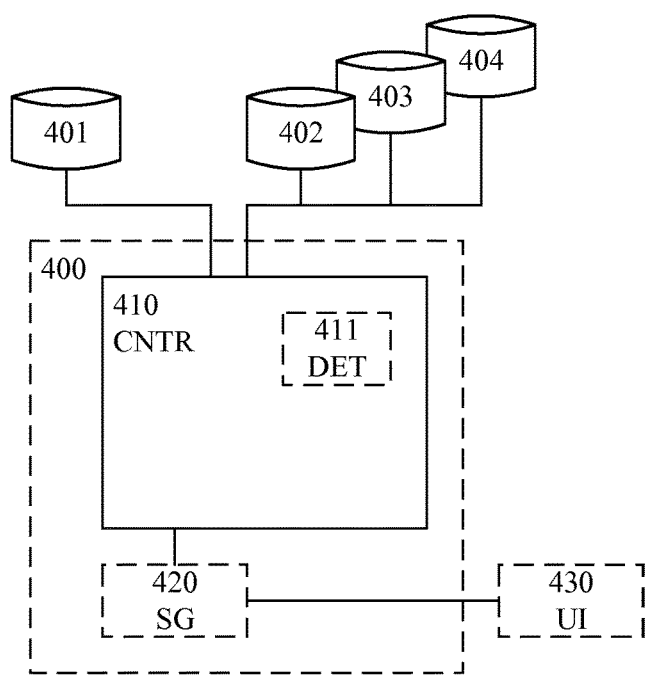
FIG. 4 is a schematic block diagram illustrating an example arrangement according to some embodiments.

FIG. 4 schematically illustrates an example arrangement according to some embodiments. The example arrangement may, for example, be comprised in a control node 400, and/or may be configured to cause performance of one or more of the method steps explained in connection to FIG. 1.

Thus, the arrangement is for evaluation of an organizational partition of a plurality of developers into groups of developers, wherein each developer has a developer identity, and wherein the evaluation is in relation to alterations, by the plurality of developers, of a software code comprising a plurality of parts.

The software code is associated with a change history register indicative of previous alterations of the parts of the software code, each indication of previous alteration of a part of the software code being associated in the change history register with the developer identity of one or more of the plurality of developers.

The software code and the change history register are comprised in storing circuitry accessible by the arrangement, illustrated in FIG. 4 as databases 401, 402, 403, 404. It should be noted that any suitable storage circuitry (databases, memory circuitry, registers, etc.) may be used for the purpose of storing the software code and the change history register. The storage circuitry may comprise more than one physical storage unit (possibly in different devices and/or in different geographical locations) or a single physical storage unit, and the software code and the change history register may be comprised in the same or different storage units. In FIG. 4, the software code is distributedly stored in the databases 402, 403, 404 and the change history register is stored in the database 401.

The arrangement comprises controlling circuitry (CNTR, e.g. a controller) 410 associated with the storing circuitry (i.e. the storing circuitry is accessible to the controlling circuitry).

The controlling circuitry 410 is configured to cause (for each of at least two of the groups of developers and for each of one or more of the parts of the software code) parsing—based on the part, on the developer identities of the developers of the group, and on one or more of the previous alterations—of the change history register to acquire, for each developer identity of the group, an association metric indicative of a number of associations between the developer identity and an indication of one of the one or more previous alterations of the part of the software code.

The controlling circuitry 410 is also configured to cause determination (for each of at least two of the groups of developers) of an intra-group collaboration metric and an inter-group collaboration metric based on the association metrics, and generation of a partition evaluation signal based on the intra-group collaboration metric and the inter-group collaboration metric of the at least two groups of developers.

For example, the determinations may be performed by determination circuitry (e.g. a determiner—DET) 411 and the generation may be performed by signal generating circuitry (e.g. a signal generator—SG) 420. The determination circuitry may be comprised in the controlling circuitry 410 as illustrated in FIG. 4, or it may be otherwise associated with the controlling circuitry 410. Similarly, the signal generating circuitry may be comprised in the controlling circuitry 410, or it may be otherwise associated with the controlling circuitry 410 as illustrated in FIG. 4. As exemplified above, the generated signal may be used as input to a user interface (UI) 430.

Thus, according to some embodiments an approach is provided to measure trends in coordination needs of software organizations. The effectiveness of a software organization may be measured with respect to coordination needs and feedback (partition evaluation signal) may be produced regarding how the coordination improves over time. The approach enables an organizing function to take (appropriate) corrective actions if an organization is in-effective. The corrective actions may comprise organizational changes and/or architectural changes.

Embodiments presented herein may also be used to simulate a new organization before it is put into practice to evaluate the organizational efficiency (e.g. detect coordination bottlenecks).

Some benefits of embodiments disclosed herein include:
- Provision of an up-to-date view of organizational efficiency, how well the organization of developers aligns with the software architecture.
- Detection of groups that do not work on the same part of the software code and thereby lack meaning from an architectural perspective.
- Detection of groups with high coordination needs with other groups in the organization.
- Evaluation of organizational changes to ensure that the coordination between groups decreases.
- Evaluation of architectural design changes to learn their effect on the coordination between groups.
- Provision of early warnings of newly appearing coordination bottlenecks.
- Identification of new organizational partitions by detection of developers that work on related tasks but are in different groups of the organization.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. The general purpose circuitry may, for example, be associated with or comprised in an apparatus such as a control node, such as a server node.

Embodiments may appear within an electronic apparatus comprising arrangements, circuitry, and/or logic according to any of the embodiments described herein. Alternatively or additionally, an electronic apparatus may be configured to perform methods according to any of the embodiments described herein.

Figure 5:
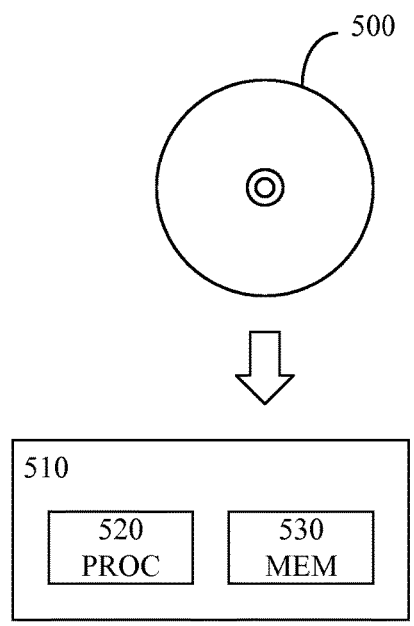
FIG. 5 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in an electronic apparatus 510. When loaded into the data processing unit, the computer program may be stored in a memory (MEM) 530 associated with or comprised in the data-processing unit. According to some embodiments, the computer program may, when loaded into and run by the data processing unit, cause execution of method steps according to, for example, any of the methods illustrated in FIGS. 1 through 2 or otherwise described herein.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

The invention claimed is:

1. A method of evaluating an organizational partition of a plurality of developers into groups of developers, wherein each developer has a developer identity, and wherein the evaluation is in relation to alterations, by the plurality of developers, of a software code comprising a plurality of parts,
wherein the software code is associated with a change history register indicative of previous alterations of the parts of the software code, each indication of previous alteration of a part of the software code being associated m the change history register with the developer identity of one or more of the plurality of developers, and
wherein the software code and the change history register are comprised in storing circuitry,
the method comprising:
for each of at least two of the groups of developers and for each of one or more of the parts of the software code:
automatically parsing, using a controlling circuitry, based on the part, on the developer identities of the developers of the group, and on one or more of the previous alterations—the change history register to acquire, for each developer identity of the group, an association metric indicative of a number of associations between the developer identity and an indication of one of the one or more previous alterations of the part of the software code;
for each of at least two of the groups of developers:
automatically determining, using the controlling circuitry, an intra-group collaboration metric based on the association metrics, wherein the intra-group collaboration metric is indicative of a sum over one or more parts of the software code of a number of times two or more developers of the group are involved in one or more previous alterations of the part;
automatically determining, using the controlling circuitry, an inter-group collaboration metric based on the association metrics, wherein the inter-group collaboration metric is indicative of a sum over one or more parts of the software code of a number of times one or more developers of the group and one or more developers of another group are involved in one or more previous alterations of the part; and
automatically generating, using a signal generating circuitry, a partition evaluation signal based on the intra-group collaboration metric and the inter-group collaboration metric of the at least two groups of developers,
wherein generating the partition evaluation signal is for determination of a new software architecture based on the partition evaluation signal to increase the intra-group collaboration metric and to decrease the inter-group collaboration metric.

2. The method of claim 1, wherein determining the intra-group collaboration metric comprises determining a mutual metric of each intra-group pair of developers of the group.

3. The method of claim 1, wherein determining the inter-group collaboration metric comprises determining a mutual metric of each inter-group pair of developers.

4. The method of claim 2 wherein each mutual metric is indicative of a sum over one or more parts of the software code of a number of times the developers of the corresponding pair are involved in one or more previous alterations of the part.

5. The method of claim 1 further comprising determining a clustering metric for each group based on the intra-group collaboration metric and on the inter-group collaboration metric, and wherein the partition evaluation signal is indicative of the clustering metric.

6. The method of claim 1 wherein each indication of previous alteration of a part of the software code is further associated in the change history register with a time indication, and wherein determining the collaboration metrics comprises excluding, from the determination, previous alterations associated with a time indication outside a time window of the change history register.

7. The method of claim 6 repeatedly performed at different points in time and further comprising determining a trend of at least one of the intra-group collaboration metric and the inter-group collaboration metric, wherein the partition evaluation signal is indicative of the determined trend.

8. The method of claim 1 further comprising determining a new organizational partition of the plurality of developers based on the partition evaluation signal to increase the intra-group collaboration metric and to decrease the inter-group collaboration metric.

9. The method of claim 1, wherein the partition evaluation signal is configured to cause control of hardware utilization associated with alteration software code.

10. A hardware utilization control method comprising:
performing the method of evaluating according to claim 1; and
controlling hardware utilization associated with alteration of the software code based on the partition evaluation signal.

11. A computer program product comprising a non-transitory computer readable medium, having thereon a computer program comprising program instructions, the computer program being loadable into a data processing unit and configured to cause execution of the method according to claim 1 when the computer program is run by the data processing unit.

12. An arrangement for evaluation of an organizational partition of a plurality of developers into groups of developers, wherein each developer has a developer identity, and wherein the evaluation is in relation to alterations, by the plurality of developers, of a software code comprising a plurality of parts,
wherein the software code is associated with a change history register indicative of previous alterations of the parts of the software code, each indication of previous alteration of a part of the software code being associated in the change history register with the developer identity of one or more of the plurality of developers, and wherein the software code and the change history register are comprised in storing circuitry, the arrangement comprising controlling circuitry associated with the storing circuitry and configured to cause:

for each of at least two of the groups of developers and for each of one or more of the parts of the software code:

automatically parsing based on the part, on the developer identities of the developers of the group, and on one or more of the previous alterations of the change history register to acquire, for each developer identity of the group, an association metric indicative of a number of associations between the developer identity and an indication of one of the one or more previous alterations of the part of the software code;

for each of at least two of the groups of developers:

automatically determining, using the controlling circuitry, an intra-group collaboration metric based on the association metrics, wherein the intra-group collaboration metric is indicative of a sum over one or more parts of the software code of a number of times two or more developers of the group are involved in one or more previous alterations of the part; and automatically determining, using the controlling circuitry, an inter-group collaboration metric based on the association metrics, wherein the inter-group collaboration metric is indicative of a sum over one or more parts of the software code of a number of times one or more developers of the group and one or more developers of another group are involved in one or more previous alterations of the part; and automatically generating, using a signal generating circuitry, a partition evaluation signal based on the intra-group collaboration metric and the inter-group collaboration metric of the at least two groups of developers, wherein the partition evaluation signal is configured to cause control of hardware utilization associated with alteration of software code.

13. The arrangement of claim 12, wherein the controlling circuitry is further configured to cause determination of a new software architecture based on the partition evaluation signal to increase the intra-group collaboration metric and to decrease the inter-group collaboration metric.

14. An apparatus for hardware utilization control comprising the arrangement according to claim 12, wherein the controlling circuitry is further configured to cause control of hardware utilization associated with alteration of the software code based on the partition evaluation signal.

15. A control node comprising the arrangement of claim 12.

* * * * *